United States Patent [19]

Gerlach et al.

[11] Patent Number: 5,712,432

[45] Date of Patent: Jan. 27, 1998

[54] PIN LOAD CELL FOR WEIGHING

[75] Inventors: Hans-Joachim Gerlach, Hoechst; Ralf Waegner, Trebur; Ronald Will, Alsbach, all of Germany

[73] Assignee: Hottinger Baldwin Messtechnik GmbH, Darmstadt, Germany

[21] Appl. No.: 571,540

[22] Filed: Dec. 13, 1995

[30] Foreign Application Priority Data

Jul. 7, 1995 [DE] Germany .................. 295 10 678.6

[51] Int. Cl.⁶ .................................................. G01L 1/00
[52] U.S. Cl. ........................ 73/862.631; 73/862.629
[58] Field of Search ................... 73/862.627, 862.632, 73/862.635, 862.636, 862.637, 862.642, 862.631

[56] References Cited

U.S. PATENT DOCUMENTS

| | | | |
|---|---|---|---|
| 2,488,347 | 11/1949 | Thurston | 73/862.635 |
| 3,037,178 | 5/1962 | Pien | 73/862.627 |
| 3,100,290 | 8/1963 | Propper . | |
| 3,365,689 | 1/1968 | Kutsay | 73/862.632 |
| 4,589,291 | 5/1986 | Sander . | |
| 4,733,571 | 3/1988 | Ormond | 73/862.632 |
| 4,789,035 | 12/1988 | Hamilton et al. | 73/862.65 |
| 5,076,375 | 12/1991 | Dillon et al. | 73/862.627 |

FOREIGN PATENT DOCUMENTS

| | | |
|---|---|---|
| 0107966 | 5/1984 | European Pat. Off. . |
| 0315846 | 5/1989 | European Pat. Off. . |
| 8030920 | 10/1982 | Germany . |
| 3236708 | 6/1983 | Germany . |
| 3236532 | 4/1984 | Germany . |
| 3405127 | 9/1985 | Germany . |
| 3730702 | 3/1989 | Germany . |
| 3730703 | 3/1989 | Germany . |
| 2162322 | 1/1986 | United Kingdom . |

OTHER PUBLICATIONS

A company publication by the firm Siemens AG entitled "Load Cells of the K Series 7MH3105", Operating Instructions.

Primary Examiner—Ronald L. Ziegel
Attorney, Agent, or Firm—W. G. Fasse; W. F. Fasse

[57] ABSTRACT

A rod-shaped weighing cell (1) for a vertical compression load sensing having spherically formed and/or plane load application end surfaces (2, 3) has in the center areas (19) or recesses (19) or a cross-bore (4) to which strain gages (9) are attached. The crossbore, or areas, or recesses or is closed at both ends or covered with a metallic cover (7, 8) the edges of which are sealed e.g. welded to the weighing cell body 1A). One cover disk (7) is provided with a screw connector (10) for a lead-through of a cable (11) which is connectable to the strain gages (9). The cover disk is just large enough to enclose and seal the strain gages without enclosing or encircling the entire load cell body.

17 Claims, 2 Drawing Sheets

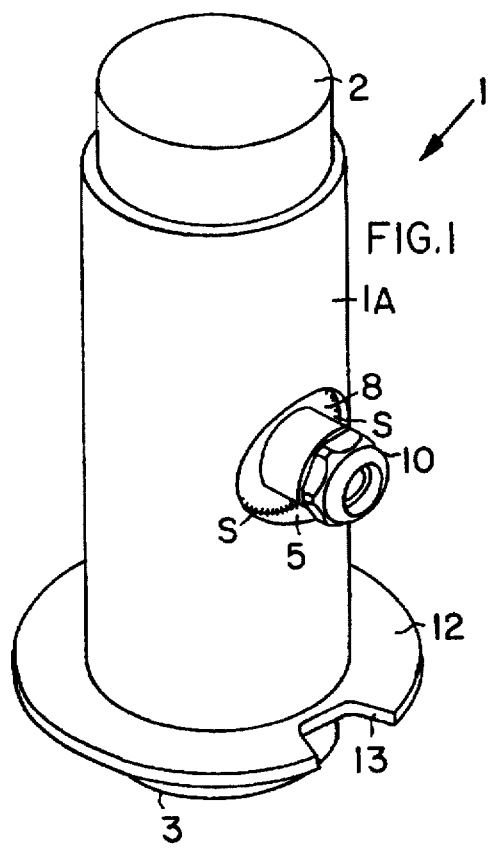
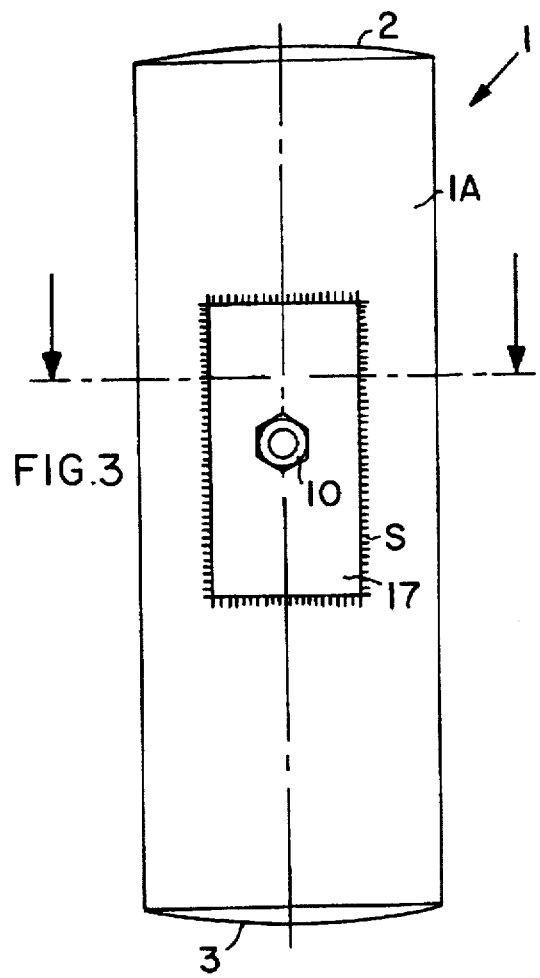
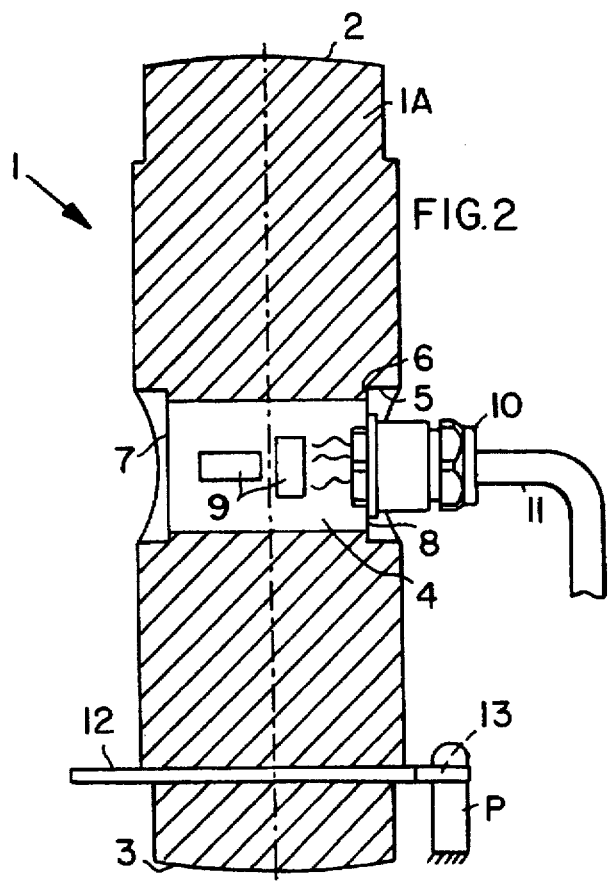
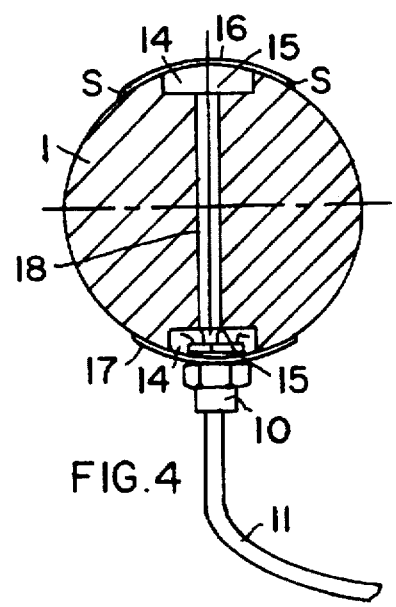

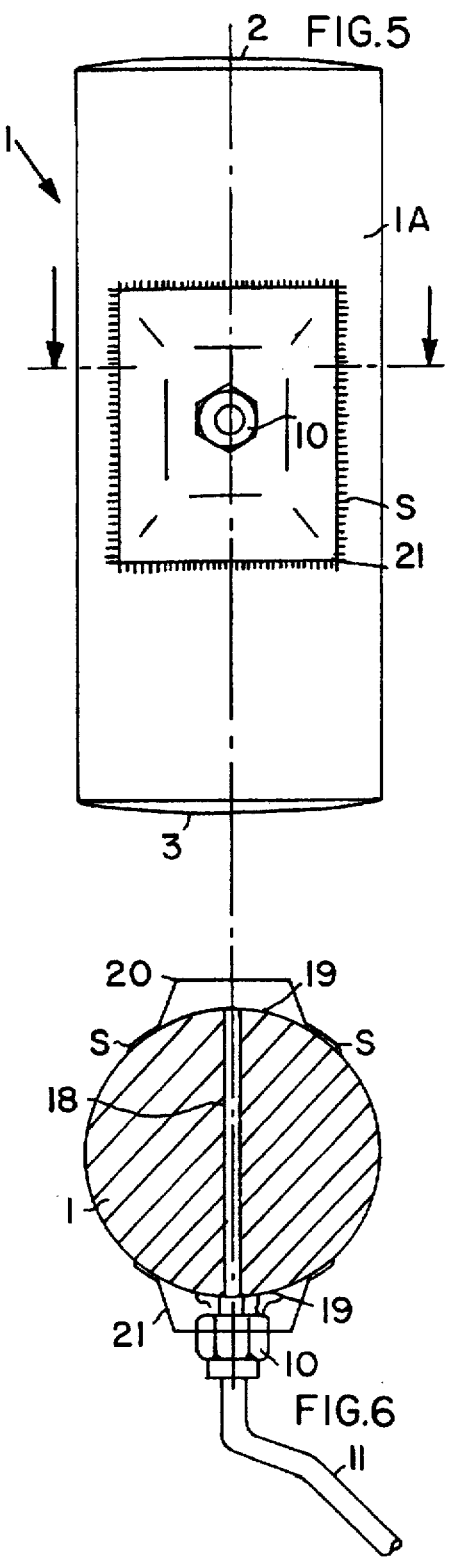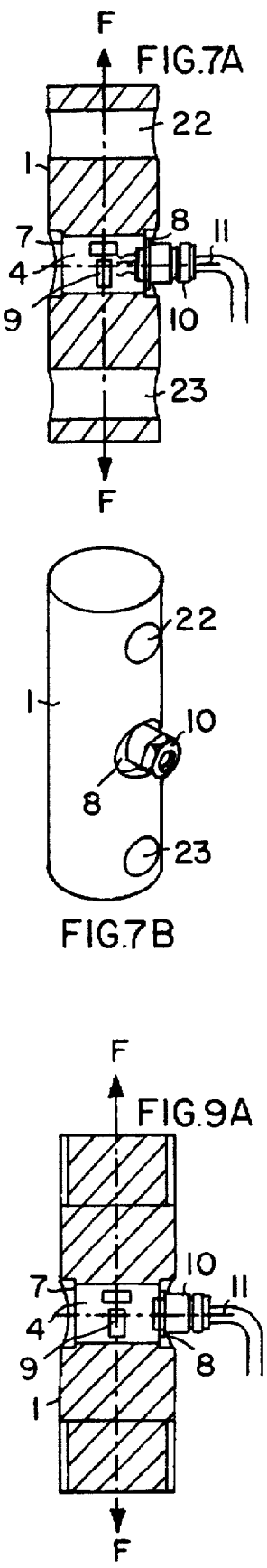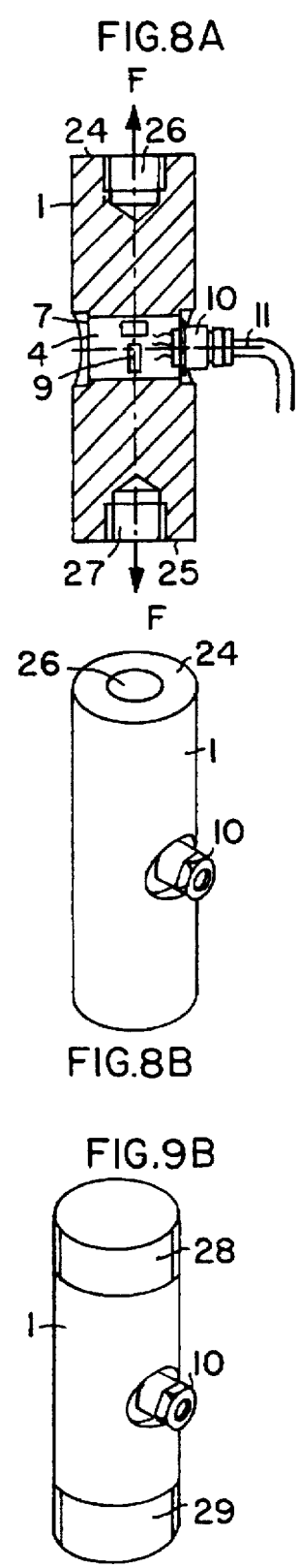

PIN LOAD CELL FOR WEIGHING

The invention relates to a rod-shaped or so-called pin load cell for weighing a load applied substantially in the axial direction and preferably having spherically formed load application end surfaces and at least one area for the attachment of strain gages between the load application end surfaces.

Such a weighing cell is known from European Patent Publication EP 0,315,846 B1, (Nordstrom), published May 17, 1989. A rod constructed as a dumbbell shape with a slender central section and substantially thicker end section, wherein the strain gages including sensors for linearizing the measured value and for temperature compensation are arranged approximately in the middle of the central section. The known weighing cell is self-stabilizing, that is, the load application end surfaces are so constructed that necessarily a reset moment is produced when the weighing cell is deflected out of a vertical position. The entire central section is covered by a corrugated pipe which is connected at the ends with the thicker end sections of the weighing cell. Furthermore, in one end section a cross-bore is provided which is connected through thinner bores with the surface of the central section and which is intended for taking up the cables from the sensors. In order to distribute the stresses in the weighing cell symmetrically, it is necessary to provide additional bores in the end sections which are not required for the cable connections.

The production of known weighing cell requires a substantial effort and expense and therefore is economically not feasible for many applications in which a robust construction is more important than highest measuring sensitivity and measuring accuracy. Particularly, the enclosing by means of a corrugated pipe is complicated in its technical production because it can be realized only if the components to be connected are precisely matched in their dimensions.

There are other constructions of weighing cells known which are self-stabilizing and comparable in their function. However, these known constructions also have expensive housings. A company publication "Weighing Cell Series K, 7MH3105, Operating Instructions" of the firm Siemens AG describes a weighing cell provided with a two-section steel sheet metal housing with an O-ring seal.

European Patent Publication EP 0,107,966 B1 (Utsunomyia), published May 9, 1984 discloses a load cell in which the strain gages are covered by an adhesively attached aluminum composite foil. Such coverings have no influence on the spring characteristic of the load cell. However, these coverings are only capable of sealing out moisture provided the marginal cut edges of the aluminum composite foil are additionally treated, for example, if they are covered with a vapor deposited aluminum seam. As a result, even this type of covering becomes rather costly, not to mention that they are sensitive to mechanical damages. For that reason alone these load cells are out of the question for many application purposes. Besides, the lead through of the cables poses difficulties.

It is the object of the invention to provide a weighing cell of the type mentioned above which is of simple construction and relatively inexpensive to manufacture. Further, the weighing cell shall particularly have a safe covering for the strain gages. The covering shall be technically simply to realize only for the areas to which strain gages are attached.

The above objects have been achieved according to the invention in that the area of the load cell or weighing cell that is provided with strain gages, is located under a metallic cover which extends only over a small portion of the circumference of the weighing or load cell and which is connected at the edges of the cover with the weighing cell body in a sealed manner.

Contrary to the known aluminum compound foil, the present metallic cover can be adapted to any kind of mechanical loading so that a sufficiently robust protection of the strain gages is achieved for the particular mode of application. The present metallic cover are simply produced and easily adapted to the respective geometry of the weighing cell or to the strain gage arrangement. Further, these covers may be so constructed that they only have a small influence on the spring characteristic of the weighing cell or that their influence is relatively easily compensatable. The type of covering and its connection with the weighing cell can be respectively so selected that disadvantageous feedbacks are practically excludable or avoided.

The connection of the cover with the weighing cell body can be accomplished by welding, especially laser welding, by soldering, or by adhesive bonding. In all instances a moisture tight enclosure of the areas with the strain gages is achieved without any adverse influence in the mechanical characteristics of the weighing cell worth mentioning. The rod-shaped weighing cell body itself can be produced between the load application end surfaces as a simple component made by turning with a cross-section that remains substantially constant along the length of the body, preferably with the same shape, whereby the requirement of low production costs is satisfied. It is self understood that, a polygonal, for example, square cross-section of the entire rod-type weighing cell or of solutions of the rod-type weighing cell may be provided.

According to an advantageous embodiment of the invention it is provided that the weighing cell has a bore extending perpendicularly to its longitudinal axis about in the middle between the load introduction end surfaces, and that the strain gages are attached to the bore wall. This feature provides in a simple manner a cross-sectional area of reduced strength in the weighing cell, said cross-sectional area being very suitable for the attachment of the strain gages. Besides, spaced is gained in which the strain gages are already substantially protected against destruction by outer mechanical influences. For closing the bore simply shaped sheet metal covers, such as deep drawn or pressed sheet metal covers are suitable.

It is also possible to provide the bore without any substantial effort, with bore sections near the ends of the bore having a larger diameter, whereby the circular facing ring surfaces between the larger and smaller bore diameters serve as a shoulder for a covering having a circular disk shape. Further, the shoulder provides an especially good and easy to realize connection between the weighing cell and the cover. The shaping can take place by simple chip removing machining and contributes to economically manufacturing the weighing cell.

According to another embodiment of the invention the weighing cell is provided with recesses positioned approximately in the middle between the load introduction end surfaces and diametrically opposite each other. The recesses have base surfaces to which the strain gages are attached and that the recesses are closed by covers which extend over the edge of the recesses and are connected with the weighing cell along the edge of the recess. By dimensioning the recesses with regard to their size and depth, any desired cross-sectional weakening of the weighing cell can be accomplished, whereby again merely a simple economical milling and/or drilling operation is required for the production. Plane or pre-shaped sheet metal sections can be used for a cover which covers the recess and the edges of which are very easily connected with the weighing cell body.

Finally, one can apply the teaching of the invention even to a weighing cell not having a cross-section of reduced strength, whereby the strain gages are simply attached to the jacket surface, which is preferably cylindrical and the strain gages are then enclosed by a lid-type cover, the edges of which are connected to the weighing cell. In this embodiment the weighing cell practically does not require any mechanical working for providing the areas to which the strain gages may be attached. By providing the cover with a respective configuration it can be assured that the strain gages are protected without any contact between the cover and the strain gages.

In the two last mentioned embodiments it is suitable to provide one, if required several, cross-bores, whereby an internal cable guide is provided for a cable or wiring connecting the strain gages and whereby only one cable outlet to the outside is necessary. For this purpose, one of the covers such as that shown in FIGS. 1 and 2, includes a screwed connection for the lead through of cables or wires. Such screwed connections are known in the art for varied purposes. A separate cable box is not necessary in these embodiments.

In order to secure the weighing cell against rotation about its longitudinal axis, the weighing cell according to the invention comprises a safety device such as a ring-shaped securing disk that cooperates with a fixed stop to hold the load cell body against rotation about its longitudinal axis. The securing disk is connected to the weighing cell body.

The teaching of the invention can also be applied to weighing cells in which at least one of the load application surfaces is constructed as a plane surface. The load application surface may thereby be provided with devices, for example in the form of threaded devices through which it becomes possible to connect load introduction components to the weighing cell, for example for applying a tension load.

The invention will now be described with reference to example embodiments which are shown in the accompanying drawings, wherein:

FIG. 1 is a perspective view of a weighing cell with a strain gage arranged in a bore;

FIG. 2 shows a longitudinal section through the weighing cell according to FIG. 1;

FIG. 3 is a view of a cylindrical weighing cell with recesses for the application of the strain gages;

FIG. 4 is a sectional view through the weighing cell according to FIG. 3;

FIG. 5 is a view of a cylindrical weighing cell with strain gages arranged on the jacket surface;

FIG. 6 is a sectional view through the weighing cell according to FIG. 5;

FIG. 7a is a longitudinal section through a weighing cell with cross-bores providing load application surfaces;

FIG. 7b is a perspective view of the weighing cell according to FIG. 7a;

FIG. 8a shows a longitudinal section through a weighing cell with threaded bores in the end surfaces serving as load introduction surfaces;

FIG. 8b is a perspective view of the weighing cell according to FIG. 8a;

FIG. 9a is a longitudinal section through a weighing cell outer threading at the ends for providing load introduction surfaces; and FIG. 9b is a perspective view of the weighing cell according to FIG. 9a.

The example shown in FIGS. 1 and 2 is a rod-type weighing cell 1 having a cell body 1A with a circular cylindric configuration and spherically formed load introduction surfaces 2 and 3 at the ends. The weighing cell may, however, also have a polygonal, for example a square cross-section. The end sections next to the central section have a somewhat smaller diameter than the central section to provide a small shoulder. In the center between the two load introduction surfaces 2 and 3 the weighing cell 1 has a bore 4 perpendicularly to the longitudinal axis. The end sections 5 of the bore 4 have a somewhat larger diameter, whereby circular ring-shaped facing surfaces 6 are formed as a rest for disk-shaped covers 7 and 8. Strain gages 9 are arranged inside the bore 4. The cover 8 is provided with a screw connection 10 for a lead through of a cable 11 through which the strain gages 9 are connectable to an evaluating circuit. The covers 7 and 8 are connected in the bore 4 by welding seams in a sealed manner.

A ring-shaped disk 12 is provided near the lower load introduction surface 3 rigidly secured to the weighing cell 1 for securing the body 1A of the weighing cell 1 against rotation about its longitudinal axis. A safety device is provided in that the disk 12 has a cut-out 13 in the disk edge engaged by a fixed stop e.g. a pin P in the mounted state of the weighing cell 1. Thus, it is prevented that the weighing cell 1 can rotate about its own longitudinal axis, whereby damage to the cable connection is avoided.

In the embodiment according to FIGS. 3 and 4, the weighing cell 1 is constructed as a circular cylinder between its load introduction surfaces 2 and 3. The load cell comprises two recesses 14 arranged diametrically opposite each other and with bottom surfaces 15 to which strain gages are secured. The recesses 14 are arched over by covers 16 and 17 which are adapted to the cylindrical shape of the weighing cell 1 and are welded to the weighing cell along the edges of the covers 16, 17. The cover 17 has a screw connection 10 for the lead through of a cable 11. The recesses 14 are interconnected by a thin cross-bore 18 passing radially through the load cell 1. An internal cable connection passes through the cross-bore 18. The covers 16, 17 are secured to the body 1A by a seal S along the edges of the covers.

The embodiment according to FIGS. 5 and 6 is of particularly simply construction and thus its manufacture is even more advantageous. The load cell 1 is entirely cylindrical between the load introduction end surfaces 2 and 3 and the only mechanical shaping required is a cross-bore 18 because the areas 19 for the application of the strain gages are provided diametrically opposite each other on the outer jacket surface of the load cell 1. In this instance the covers 20, 21 are constructed as a hood and connected by a seal S along the edges to the weighing cell 1 by welding. The cover 21 comprises a screw connection 10 for the lead through of a cable 11 which is also connected through the cross-bore 18 with the strain gages under the other covering.

A safety device against rotation of the load cell body about the longitudinal load cell axis may also be provided in the weighing cells of FIGS. 3 to 6. In any of these embodiments, the load cell body may have a polygonal cross-section, for example, a square cross-section may be provided.

The load cells shown in FIGS. 1 to 6 are intended for introducing of compression forces. An advantageous application of the invention in connection with weighing cells for measuring of tension forces is shown by the example embodiments illustrated in FIGS. 7 to 9. In these example embodiments the weighing cells 1 comprise a circular cylindrical rod which, analogous to the load cell according to FIG. 1 has a bore 4 in its center extending perpendicularly or radially to the longitudinal cylinder axis. The strain gages 9 are arranged in the bore 4. The bore 4 is closed by covers 7 and 8, whereby the cover 8 comprises a screw connector 10 for a lead through of a cable 11.

The load introduction surfaces in the weighing cell according to FIGS. 7a and 7b are formed by cross-bores 22 and 23 which are arranged in the end sections of the weighing cell 1 parallel to one another and parallel to the bore 8. However, these bores 22, 23 may also be arranged perpendicularly to the bore 4. The cross-bores 22, 23 serve for insertion of pegs for transmitting the tension forces F into the weighing cell 1.

FIG. 8 shows a modification of the weighing cell 1 which is provided with threaded bores 26, 27 extending coaxially to the cylinder axis for introducing the load into the facing surfaces 24, 25 of the weighing cell. Connector members suitable for the force introduction such as rods or pivot heads are screwable into the threaded bores 26, 27.

In the weighing cell according to FIGS. 9a and 9b the end sections of the weighing cell 1 are provided with outer threadings 28, 29 for the connection of force introducing components which can be screwed onto the respective outer threading 28, 29.

All embodiments according to the invention are very robust and their construction is simple and these embodiments are protected against external interfering influences by the present covers that do not extend all around the load cell body. The metallic coverings can be constructed in all instances in such a way and can be connected with the weighing cell so that on the one hand a good protection of the sensitive strain gage arrangement is achieved, and that on the other hand any influences emanating from the covers, that could affect the spring characteristic of the weighing cell are negligibly small or else they can be compensated in a measuring technique manner. Finally, the securing of the covers is accomplished by connection methods which do not adversely affect the measuring precision. The cable lead out from the weighing cell is accomplished in a very simple manner through a conventional, tight cable screw connection which is directly sitting on the cover and which in combination with customary embedding masses provide an effective seal. Internal circuit connections avoid the expensive cable boxes that are attached to the housing of weighing cells. The weighing cells according to the invention are economically manufacturable and may be used in all those instances where weighing equipment must be provided at the lowest possible costs.

Although the invention has been described with reference to specific example embodiments, it will be appreciated that it is intended to cover all modifications and equivalents within the scope of the appended claims.

We claim:

1. A pin load cell for a load applied substantially in an axial direction, comprising an elongated load cell body (1A) including load application end surfaces (2, 3) and an outer surface between said end surfaces, at least one surface area positioned between said load application end surfaces (2, 3) for attaching of at least one strain gage (9) to said elongated load cell body, at least one strain gage (9) attached to said at least one surface area of said elongated load cell body, a metallic cover (7, 8; 16, 17; 20, 21) covering only a portion of said outer surface of said elongated load cell body sufficient to cover said at least one surface area, and a seal (S) connecting said cover along its edges to said elongated load cell body (1A) for sealing said at least one surface area, wherein said elongated load cell body (1A) of said weighing cell (1) comprises a throughbore (4) approximately in the center between said load application end surfaces (2, 3), said throughbore extending perpendicularly to a longitudinal axis of said elongated load cell body and having a bore wall forming said at least one surface area to which said at least one strain gage (9) is applied.

2. The pin load cell of claim 1, wherein said cover (7, 8; 16, 17; 20, 21) is connected with said elongated load cell body by welding, or laser welding to form said seal (S).

3. The pin load cell of claim 1, wherein said cover (7, 8; 16, 17; 20, 21) is connected with said elongated load cell body by soldering to form said seal.

4. The pin load cell of claim 1, wherein said cover (7, 8; 16, 17; 20, 21) is connected with said elongated load cell body by gluing to form said seal.

5. The pin load cell of claim 1, wherein said elongated load cell body (1A) has a cross-section that remains substantially constant between said load application end surfaces (2, 3).

6. The pin load cell of claim 5, wherein said elongated load cell body (1A) has a circular or polygonal cross-section.

7. The pin load cell of claim 1, further comprising a safety device (12) for cooperating with a fixed stop (P) to hold said elongated load cell body (1A) against rotation about its longitudinal axis.

8. The pin load cell of claim 1, wherein at least one of said load application surfaces is a plane surface.

9. A pin load cell for a load applied substantially in an axial direction, comprising an elongated load cell body (1A) including load application end surfaces (2, 3) and an outer surface between said end surfaces, at least one surface area positioned between said load application end surfaces (2, 3) for attaching of at least one strain gage (9) to said elongated load cell body, at least one strain gage (9) attached to said at least one surface area of said elongated load cell body, a metallic cover (7, 8; 16, 17; 20, 21) covering only a portion of said outer surface of said elongated load cell body sufficient to cover said at least one surface area, and a seal (S) connecting said cover along its edges to said elongated load cell body (1A) for sealing said at least one surface area, wherein said elongated load cell body comprises a throughbore (4) having a bore diameter and bore end sections (5) having a larger diameter than said bore diameter to form a shoulder (6), said metallic cover having a disk-shape or cup-shape arranged in said bore end sections (5) and resting on circular outwardly facing surfaces of said shoulder (6) between said larger diameter and said diameter of said bore (4), said metallic cover being connected at a cover margin with said elongated load cell body (1A) of said pin load cell (1) to form said seal, and wherein said at least one surface area to which said at least one strain gage (9) is attached, is a wall of said throughbore.

10. A pin load cell for a load applied substantially in an axial direction, comprising an elongated load cell body (1A) including load application end surfaces (2, 3) and an outer surface, at least two surface areas positioned between said load application end surfaces (2, 3) for attaching at least two strain gages (9) to said elongated load cell body, at least one strain gage (9) attached to each of said at least two surface areas of said elongated load cell body, at least two metallic covers (7, 8; 16, 17; 20, 21) each covering only a portion of said outer surface of said elongated load cell body, each cover having a size sufficient to cover one of said at least two surface areas, and a seal (S) connecting each of said covers along its edges to said elongated load cell body (1A) for sealing said at least two surface areas, wherein said elongated load cell body (1A) comprises at least two recesses (14) positioned opposite each other and approximately midway between said load application end surfaces (2, 3), each of said at least two recesses (14) having a recess surface (15) thereby forming said at least two surface areas to which said at least two strain gages are attached, a cross-bore interconnecting said two recesses, wherein each of said at least two recesses (14) is closed by one of said metallic covers, and wherein an edge of said at least two covers is secured to said elongated load cell body to form said seal (S) which also closes said cross-bore.

11. The pin load cell of claim 10, further comprising a screw connector (10) forming a lead-through for a cable (11), said screw connector (10) passing through said cover (8, 17, 21).

12. A pin load cell for a load applied substantially in an axial direction, comprising an elongated load cell body (1A) including load application end surfaces (2, 3) and an outer surface between said end surfaces, at least two surface areas (19) positioned on said outer surface approximately midway between said load application end surfaces (2, 3) for attaching of at least one strain gage (9) to each of said surface areas of said load cell body, at least one strain gage (9) attached to each of said at least two surface areas of said elongated load cell body, at least two separate metallic covers (7, 8; 16, 17; 20, 21) each covering only a portion of said outer surface of said elongated load cell body sufficient for sealing a respective one of said at least two surface areas, and a seal (S) connecting each of said covers along cover edges to said elongated load cell body (1A) for sealing said at least two surface areas, whereby each of said at least two surface areas (19) is closed-up by one of said at least two metallic covers (20, 21) connected along its edges two said outer surface of said elongated cell body to form said seal, and wherein said at least two surface areas are arranged opposite each other on said elongated load cell body, and a crossbore (18) interconnecting said at least two surface areas through said elongated load cell body.

13. The pin load cell of claim 12, further comprising a screw connector (10) forming a lead-through for a cable (11), said screw connector (10) passing through said cover (8, 17, 21).

14. The pin load cell of claim 12, wherein said elongated load cell body (1A) comprises devices (22, 23) for connection with load introduction components.

15. The pin load cell of claim 12, wherein said elongated load cell body (1A) comprises devices (22, 23) for connection with load introduction components.

16. The pin load cell of claim 1, further comprising a screw connector (10) for lead-through of a cable (11), said screw connector passing through said cover (8, 17, 21).

17. The pin load cell of claim 8, wherein said elongated load cell body (1A) comprises devices for connection with load introduction components.

* * * * *

UNITED STATES PATENT AND TRADEMARK OFFICE
CERTIFICATE OF CORRECTION

PATENT NO. : 5,712,432
DATED        : Jan. 27, 1998
INVENTOR(S) : Gerlach et al.

It is certified that error appears in the above-identified patent and that said Letters Patent is hereby corrected as shown below.

On the title page:

Under [56] References Cited,
U.S. PATENT DOCUMENTS,
following line 8, insert:

| | | | |
|---|---|---|---|
| 5,566,575 | 10/1996 | Will et al. | 73/862.629 |
| 3,992,934 | 11/1976 | Clark | 73/862.631 |
| 3,695,096 | 10/1972 | Kutsay | 73/862.631 |
| 3,330,154 | 7/1967 | Habern et al. | 73/862.631 |

Under [57] ABSTRACT,
line 4,    after "recesses" delete "(19)" and instead insert --(14)--;

line 5,    after "recesses" delete "or is" and instead insert --are--;

Col. 1,   above line 1, insert the following heading:
          --TITLE OF THE INVENTION--;

between lines 1 and 2 insert the following heading:
          --FIELD OF THE INVENTION--;

UNITED STATES PATENT AND TRADEMARK OFFICE
CERTIFICATE OF CORRECTION

PATENT NO. : 5,712,432  Page 2 of 3
DATED    : Jan. 27, 1998
INVENTOR(S) : Gerlach et al.

It is certified that error appears in the above-identified patent and that said Letters Patent is hereby corrected as shown below.

| | | |
|---|---|---|
| Col. 1, | between lines 8 and 9 | insert the following heading: --BACKGROUND INFORMATION--; |
| | line 11, | after "constructed" delete "as" and instead insert --having--; |
| | between lines 57 and 58, | insert the following heading: --OBJECTS OF THE INVENTION--; |
| | between lines 63 and 64. | insert the following heading: --SUMMARY OF THE INVENTION--; |
| Col. 2, | line 8, | after "metallic" delete "cover" and instead insert --covers--; |
| | line 21, | after "influence" delete "in" and instead insert --on--; |
| | line 30, | after "of" (first occurance) delete "solutions" and instead insert --sections--; |
| | line 60, | before "the" (first occurance) delete "that"; |
| Col. 3, | between lines 36 and 37, | insert the following heading: --BRIEF DESCRIPTION OF THE DRAWINGS--; |

UNITED STATES PATENT AND TRADEMARK OFFICE
CERTIFICATE OF CORRECTION

PATENT NO. : 5,712,432
DATED : Jan. 27, 1998
INVENTOR(S) : Gerlach et al.

Page 3 of 3

It is certified that error appears in the above-identified patent and that said Letters Patent is hereby corrected as shown below.

| | | |
|---|---|---|
| Col. 3, | between lines 65 and 66, | insert the following heading: --DETAILED DESCRIPTION OF PREFERRED EXAMPLE EMBODIMENTS AND OF THE BEST MODE OF THE INVENTION--; |
| Col. 4, | line 16, | before "in" delete "seams" and instead insert --seam S--; |
| | line 45, | after "required" insert the following text: --in addition to shaping the end surfaces--; |
| | line 48, | before "surface" delete "jacket" and instead insert --circumferential--; |
| Col. 5, | line 28, | after "metallic" delete "coverings" and instead insert --covers--; |
| Col. 6, | line 32, | after "attaching" delete "of"; |
| Col. 8, | line 4, | after "edges" delete "two" and instead insert --to--; |
| | line 21, | after "lead-through" delete "of" and instead insert --for--. |

Signed and Sealed this

Twenty-sixth Day of May, 1998

*Attest:*

BRUCE LEHMAN

*Attesting Officer*         Commissioner of Patents and Trademarks